US007688840B2

(12) United States Patent
Koga

(10) Patent No.: US 7,688,840 B2
(45) Date of Patent: Mar. 30, 2010

(54) METHOD FOR INCORPORATING NEW DEVICE IN INFORMATION PROCESSING APPARATUS, INFORMATION PROCESSING APPARATUS AND COMPUTER READABLE INFORMATION RECORDING MEDIUM

(75) Inventor: Kazuhiro Koga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1087 days.

(21) Appl. No.: 11/304,790

(22) Filed: Dec. 16, 2005

(65) Prior Publication Data

US 2007/0106821 A1 May 10, 2007

(30) Foreign Application Priority Data

Oct. 17, 2005 (JP) .............................. 2005-301768

(51) Int. Cl.
*H04L 12/28* (2006.01)
*H04J 3/26* (2006.01)
*G06F 3/00* (2006.01)
*G06F 13/36* (2006.01)

(52) U.S. Cl. .......................... 370/419; 370/432; 710/5; 710/312

(58) Field of Classification Search ......... 370/419–432; 709/201–203, 220–224; 710/302–316, 8–19, 710/62–64

See application file for complete search history.

(56) References Cited

U.S. PATENT DOCUMENTS 6,725,317 B1 * 4/2004 Bouchier et al. ............. 710/312

| 7,197,589 | B1 * | 3/2007 | Deneroff et al. | ............. 710/302 |
|---|---|---|---|---|
| 7,328,297 | B2 * | 2/2008 | Chu | ............................ 710/301 |
| 7,360,022 | B2 * | 4/2008 | Tian et al. | .................... 711/123 |
| 7,363,415 | B2 * | 4/2008 | Chu | ............................ 710/313 |
| 7,376,779 | B2 * | 5/2008 | Chu | ............................ 710/313 |
| 7,441,066 | B2 * | 10/2008 | Bouchier et al. | ............. 710/312 |
| 2003/0115382 | A1 | 6/2003 | Kimoto | |
| 2003/0186697 | A1 | 10/2003 | Bazin | |

FOREIGN PATENT DOCUMENTS

| JP | 2000-267950 | 9/2000 |
|---|---|---|
| JP | 2002-132741 | 5/2002 |
| JP | 2003-186697 | 7/2003 |

OTHER PUBLICATIONS

K. Fraser, et al., "Safe Hardware Access with the Xen Virtual Machine Monitor", Internet Citation, Oct. 2004, XP002370809, Retrieved from internet: http://www.cl.cam.ac.uk/{akw27/papers/safehw-oasis04-final.pdf.
M. Swift, et al., "Improving the reliability of commodity operating systems", ACM, New York, vol. 37, No. 5, Dec. 1, 2003, pp. 207-222.
European Search Report issued on Dec. 29, 2008 in corresponding European Patent Application No. 05292667.2.
Japanese Office Action mailed Jul. 21, 2009 in corresponding Japanese Patent Application 2005-301768.

* cited by examiner

*Primary Examiner*—Man Phan

(57) ABSTRACT

In order to incorporate a new device in an information processing apparatus, a) dividing a control system of the information processing apparatus into a plurality of control system; one control system of the plurality of control systems carrying out processing for controlling the new device by directly accessing the same; c) another control system of the plurality of control system controlling the one control system directly accessing the new device and carrying out processing for controlling the same, are carried out.

16 Claims, 17 Drawing Sheets

METHOD FOR INCORPORATING NEW DEVICE IN INFORMATION PROCESSING APPARATUS, INFORMATION PROCESSING APPARATUS AND COMPUTER READABLE INFORMATION RECORDING MEDIUM

BACKGROUND OF THE INVENTION

1. Field of the Invention

The present invention relates to a method for incorporating a new device in an information processing apparatus, an information processing apparatus having a function of executing the method, a program for executing the method, and a computer readable information recording medium storing the program.

2. Description of the Related Art

Recently, in information processing apparatus such as a server for which high quality processing and high performance are required, adding of hardware resource without interrupting the system is required.

For example, for a server which is applied for online banking, network shopping or such, the following items may be demanded:

1) System interruption is not allowed for 24 hours.

2) A hardware can be added according to a work load without system interruption.

3) Limited hardware resources can be dynamically allocated for a work of a higher load.

4) Hardware cost reduction is required.

In order to meet these requirements, a minimum necessary hardware resource should be safely added without interruption of an operating system (simply refereed to as an 'OS', hereinafter) in a system upon operation by the OS.

In this case, in the related art, a system board in which a set of devices including a CPU, a memory and an input/output unit (simply referred to as an IO, hereinafter) is incorporated in an existing system as a unit. By thus including a CPU in the unit to add, diagnosis, initialization and device configuration information creation of various types of devices such as a memory mounted to this additional hardware can be previously carried out by the CPU under the control of a firmware. As a result, the additional hardware can be safely incorporated in the existing system.

However, in a cost saving viewpoint, incorporating a hardware resource such as a system board, not having its own CPU, in an existing system is preferable.

When hardware resources, such as a CPU, a memory and an IO will be incorporated in an existing system one by one separately, the following problem may occur. A case is assumed in which, when such an additional hardware will be incorporated in the existing system, a CPU upon operation under the control of an OS of the existing system directly accesses the additional hardware, for which diagnosis, initialization and device configuration information creation have not been carried out yet. In such a case, if an access error occurs when the direct access is thus made to the additional hardware by the CPU, a system down may occur in the existing system.

Therefore, a scheme, allowing safely incorporating a hardware resource having no its own CPU, in a condition under the control of an OS, in an existing system, is demanded.

The above-mentioned problem is described in detail as follows:

First a computer system below is assumed.

This system is configured by a plurality of system boards, and each of the respective system boards have its own CPU, IO, and memory, mounted thereto.

When the system is started up, a firmware is expanded in the memory, this firmware produces device configuration information for the system in the memory, and starts up an OS.

The OS applies the device configuration information produced by the firmware to control various devices belonging to the system.

'The OS applies the device configuration information produced by the firmware to control various devices belonging to the system' means the following state:

That is, in this state, when processing of software S, for example, is carried out under the control of the OS, a device D, for example, can be applied actually for the processing of the software S under the control of the OS.

Further, in this state, when the device D has a trouble by some cause for example, predetermined trouble handling processing can be carried out in the processing of the software S under the control of the OS.

FIG. 1 shows one example of such a system.

In FIG. 1, SYS(X) 100 denotes a system upon operation under the control of an OS 132, and a CPU(A) 110 and a CPU(B) 120 operate in the system SYS(X) 100. MEM(X) 130 denotes a memory mounted to the system SYS(X) 100, and stores a firmware 133 (FIRM 133), device configuration information (Devinfo(X) 135) for the system SYS(X) 100 created by the firmware 133.

SB(Y) 200 denotes a system board to be newly incorporated into the existing system SYS(X) 100. MEM(Y) 230 denotes a memory on the system board SB(Y) 200, and IO(Y) denotes an IO on the system board SB(Y) 200.

It is assumed that the various devices, the firmware 133 and the OS 132 shown in FIG. 1 are under the following condition:

That is, the OS 132 and the firmware 133 operate from the memory MEM(X) 130 in the system SYS(X) 100.

The device configuration information Devinfo(X) 135 for the system SYS(X) 100 is created by the firmware 133, and is stored in the memory MEM(X) 130.

The CPU(A) 110 and the CPU(B) 120 operate under the control of the OS 132. A control system under the control of the OS 132 is expressed as a 'control system C1' in FIG. 1.

The system board SB(Y) 200 is connected to the system SYS(X) 100 in a manner of hardware connection, and thus, is accessible by the CPU(A). 110 and the CPU(B) 120.

The memory MEM(Y) 230 and the IO(Y) 240 are mounted to the system board SB(Y) 200. However device configuration information thereof has not been created. As a result, the memory MEM(Y) 230 and the IO(Y) 240 are not yet under the control of the OS 132 in the system SYS(X) 100.

In the system shown in FIG. 1, no CPU is mounted to the system board SB(Y) 200 to be additionally incorporated in the existing system SYS(X) 100. Therefore, diagnosis, initialization and device configuration information creation of the devices (i.e., the memory MEM(Y) 230 and the IO(Y) 240) on the system board SB(Y) 200 should be carried out by the CPU(A) 110 or the CPU(B) 120 of the existing system SYS(X) 100, for the purpose of placing these devices (i.e., the memory MEM(Y) 230 and the IO(Y) 240) on the system board SB(Y) 200, thus connected to the existing system SYS(X) 100, under the control of the existing system SYS(X) 100.

Therefore, in the related art, as shown in Steps S1 and S2 of FIG. 2, the CPU(A) 110 or the CPU(B) 120 under the control of the OS 132 directly accesses the hardware resources (the memory MEM(Y) 230 and the IO(Y) 240) to additionally incorporate, and carries out diagnosis, initialization and device configuration information creation.

Japanese Laid-open Patent Application No. 2002-132741 discloses the related art.

SUMMARY OF THE INVENTION

When the new hardware is thus incorporated in the existing system, an operation error may occur upon direct access to the devices on the system board SB(Y) 200 to newly incorporate by the CPU(B) 120 for example under the control of the OS 132 in the existing system SYS(X) 100. Then, when this error is serious one for the system, system down of the whole existing system may occur.

This problem is described in further detail with reference to FIGS. 3 through 5.

In Step S21 of FIG. 4, when the system board SB(Y) 200 is added to the system SYS(X) 100 as new hardware, the CPU (B) 120 under the control of the OS 132 of the existing system SYS(X) 100 directly accesses the system board SB(Y) 200 (Step S11 of FIG. 3). Then, the CPU(B) 120 carries out diagnoses, initialization and device configuration information creation concerning the devices (memory MEM(Y) 230 and the IO(Y) 240) on the system board SB(Y) 200 (Step S22 of FIG. 4; Step S31 of FIG. 5). When a serious error occurs by some cause during this processing (Step S12 of FIG. 3), the existing system SYS(X) 100 falls into a system down (Step S23 of FIG. 4). In an example of FIG. 5, Step S32, the memory has a trouble, which causes the serous error.

On the other hand, when the processing of Step S22 of FIG. 4 finishes properly, or, even some error occurs which can be easily solved, incorporation of the system board SB(Y) 200 under the control of the OS 132 is thus completed in Step S24.

Thus, in the related art, as shown in FIG. 5, the CPU(B) 120 operating by the function of the OS 132, which controls the existing system SYS(X) 100, directly accesses the system board SB(Y) 200 for incorporating the same, and carries out diagnosis, initialization and device configuration information creation of the devices (the memory MEM(Y) 230 and the IO(Y) 240) on the system board SB(Y) 200.

That is, processing (diagnosis, initialization and device configuration information creation) for the incorporation purpose is carried out under the condition where the CPU(A) 110 controls the entirety of the existing system SYS(X) 100 and the CPU(B) 120 directly accesses the system board SB(Y) 200, for which diagnosis, initialization and device configuration information creation have not been carried out, both of the CPUs 110 and 120 belonging to the common control system C1 under the control of the OS 132. Therefore, if some serious error occurs during the access operation by the CPU (B) 120, the error may spread the entirety of the control system C1, and the CPU(B) 120 as well as the CPU(A) 110, both belonging to the control system C1, may together fall in an inoperative situation. As a result, the whole system may fall in an inoperative situation.

For a system for which operation interruption is not allowed throughout 24 hours for example as mentioned above, such a system down is not allowed. This means that, to add necessary hardware other than a CPU during system operation is difficult.

The present invention has been devised in consideration of this problem, and an object of the present invention is to provide a scheme by which incorporation of new hardware in an OS of an existing system can be safely achieved while, at the same time, eliminating a possible risk such as a system down of the whole system.

According to the present invention, when a new device is incorporated in an information processing apparatus, a control system of the information processing apparatus is divided into a plurality of control systems; one control system of the plurality of control systems is applied to carry out processing for controlling the new device by directly accessing the same; and another control system of the plurality of control systems is applied to control the one control system which directly accesses the new device to carry out processing for controlling the same.

As a result of the control system of the information processing apparatus being thus divided, and a first division of the control system being applied for a direct access to a new device, a serious error is prevented from spreading to a second division of the control system beyond the first divisions of the same. Accordingly, the second division of the control system can be made to continue proper operation, and thus, occurrence of a system down of the whole system of the information processing apparatus can be effectively avoided.

BRIEF DESCRIPTION OF THE DRAWINGS

Other objects and further features of the present invention will become more apparent from the following detailed description when read in conjunction with the accompanying drawings.

DETAILED DESCRIPTION OF THE PREFERRED EMBODIMENT

Figure 1:
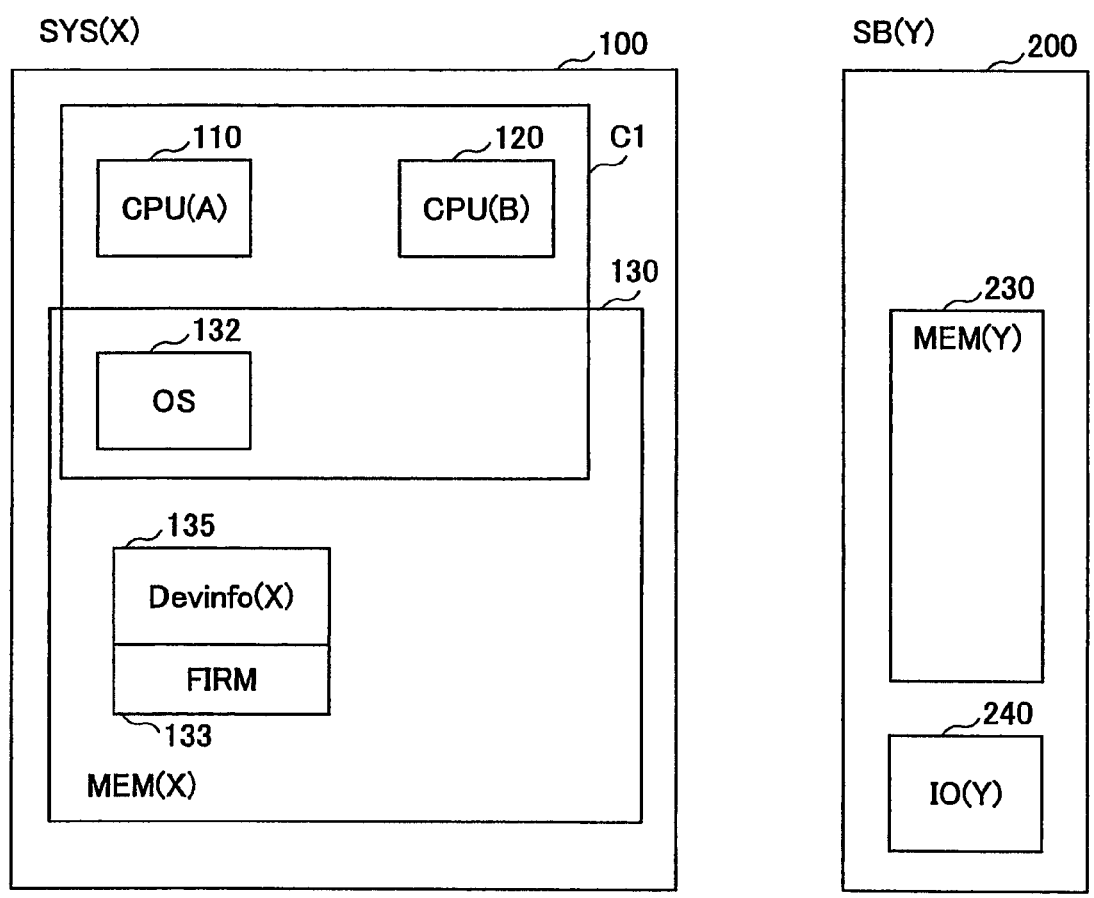
FIGS. 1, 2, 3, 4 and 5 illustrate a possible problem occurring in the related art.
Figure 2:
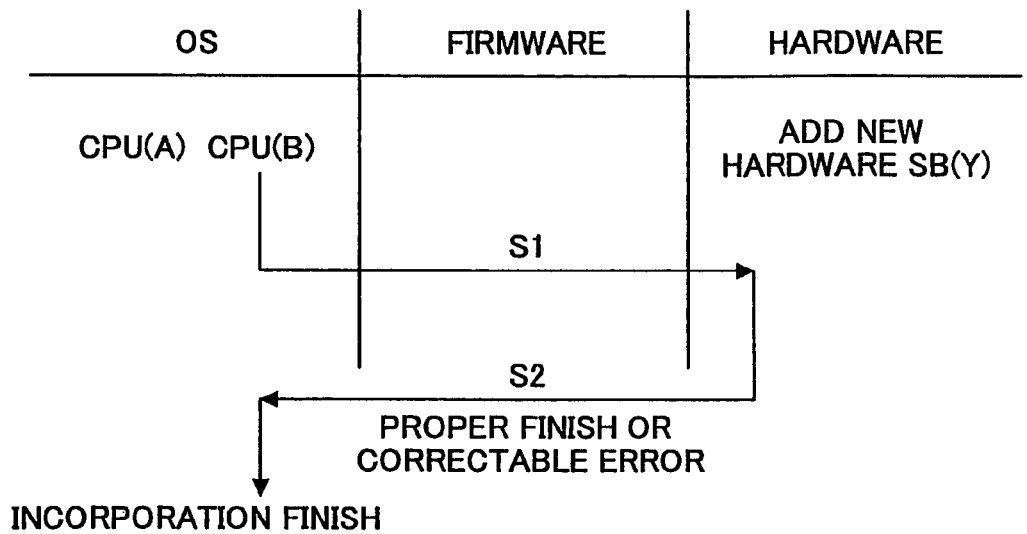
Figure 3:
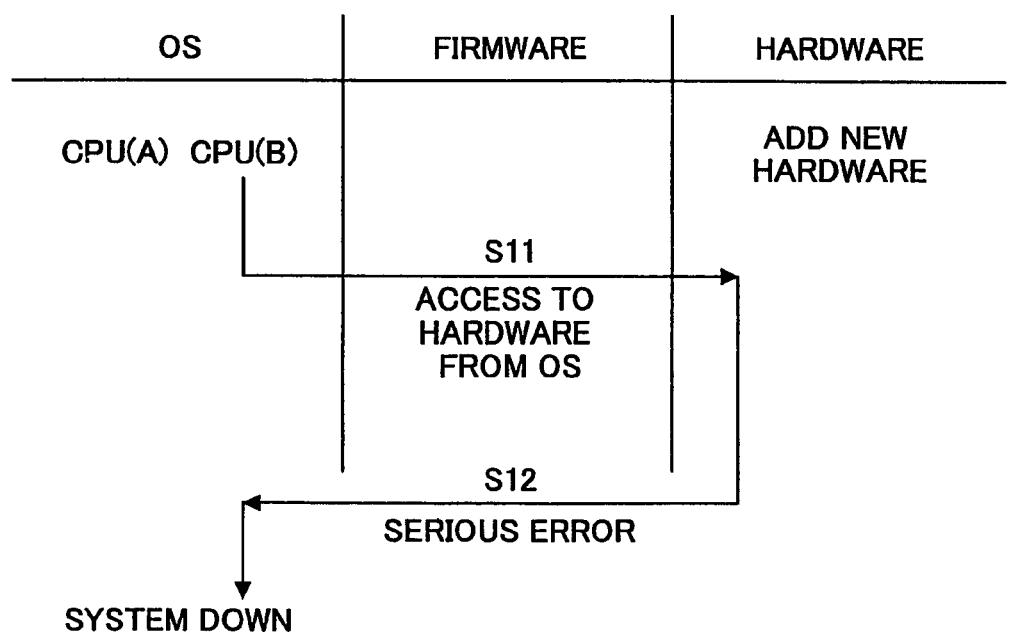
Figure 4:
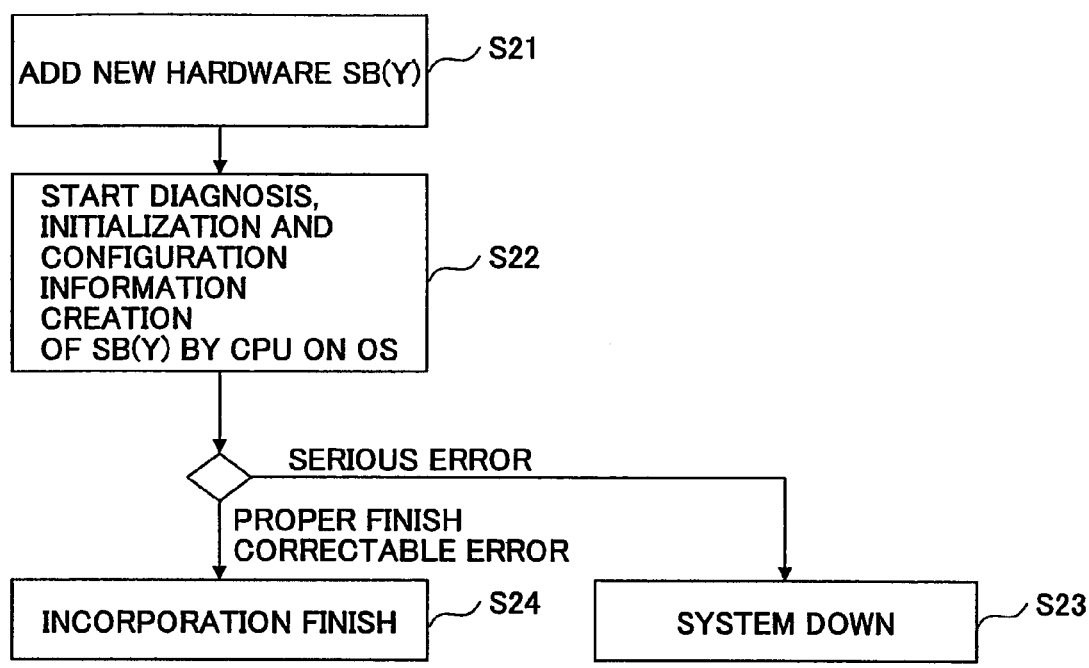
Figure 5:
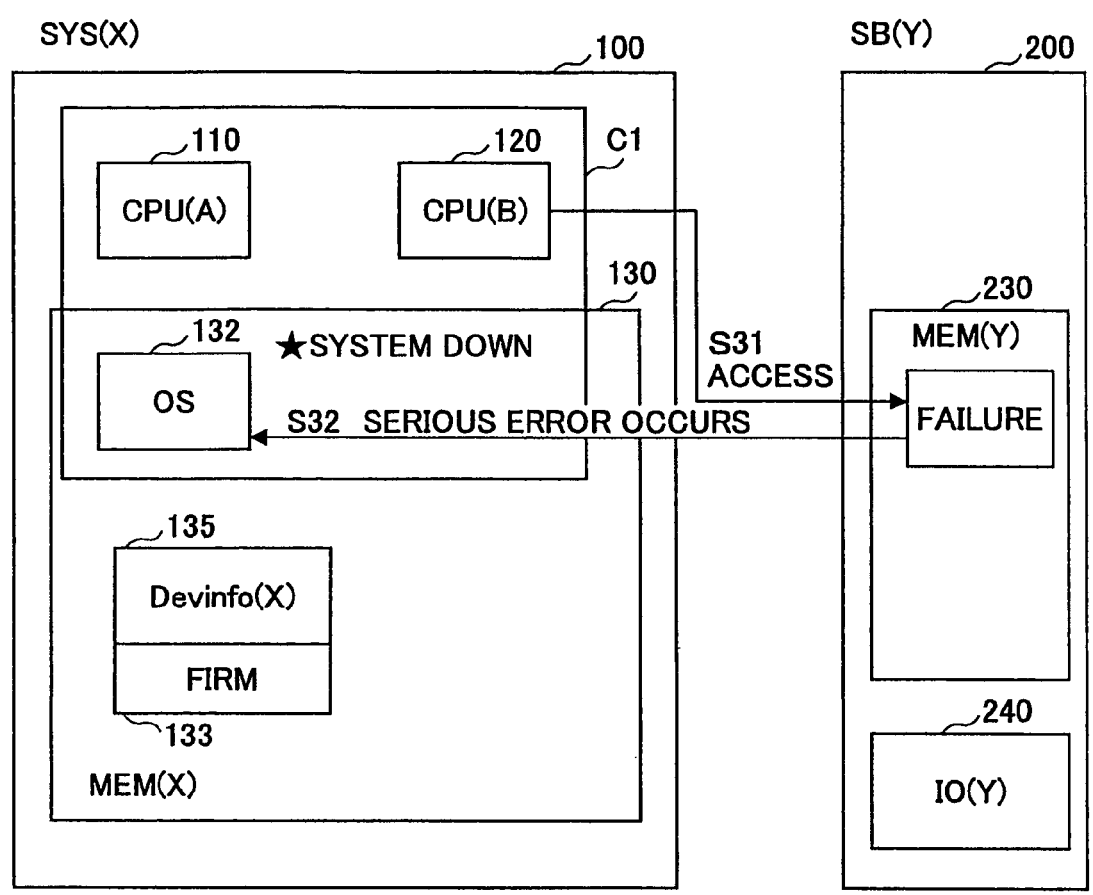
Figure 6:
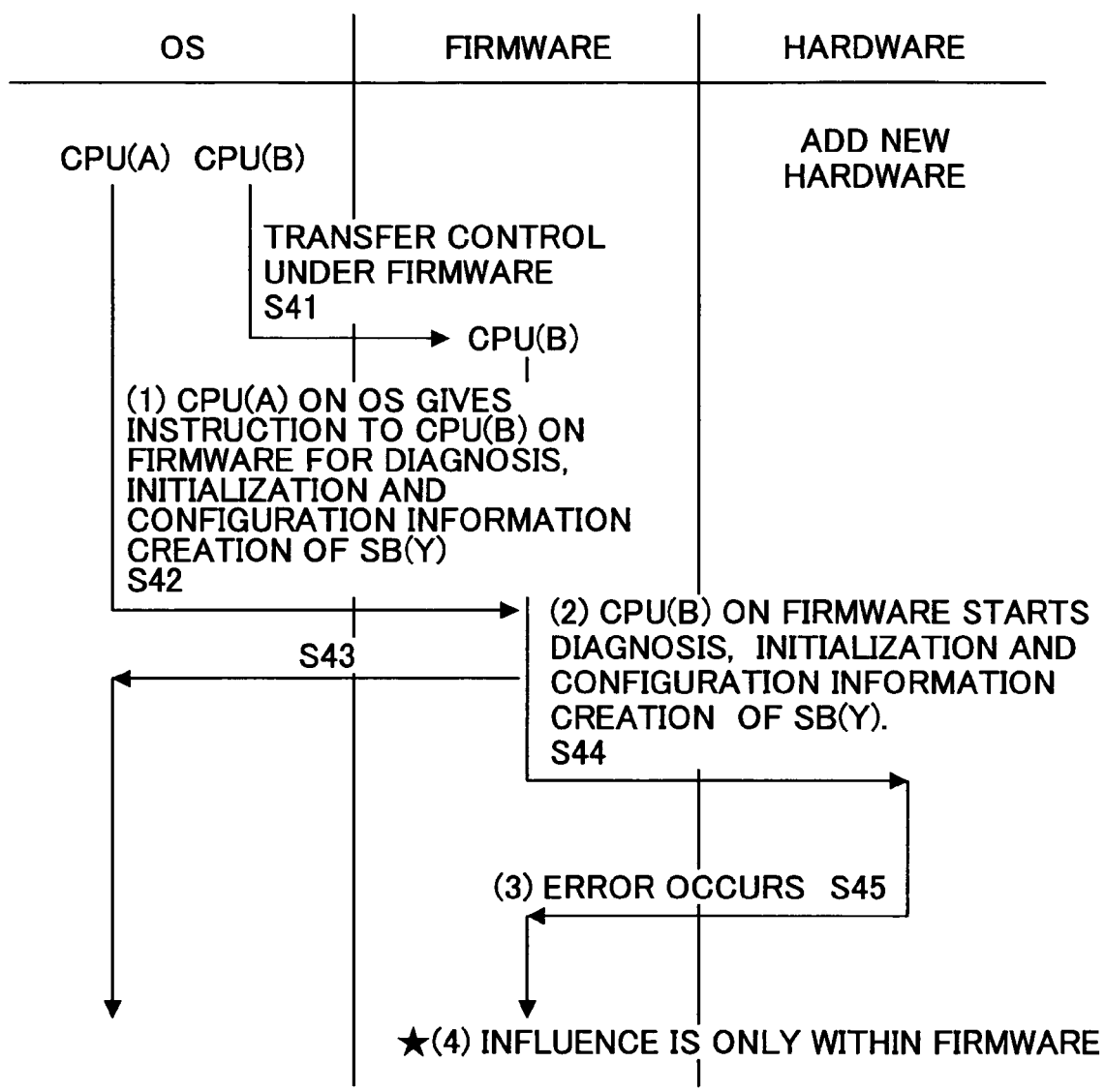
FIG. 6 shows an operation flow chart generally illustrating a method for incorporating a new device in an information processing apparatus according to one embodiment of the present invention.
Figure 7:
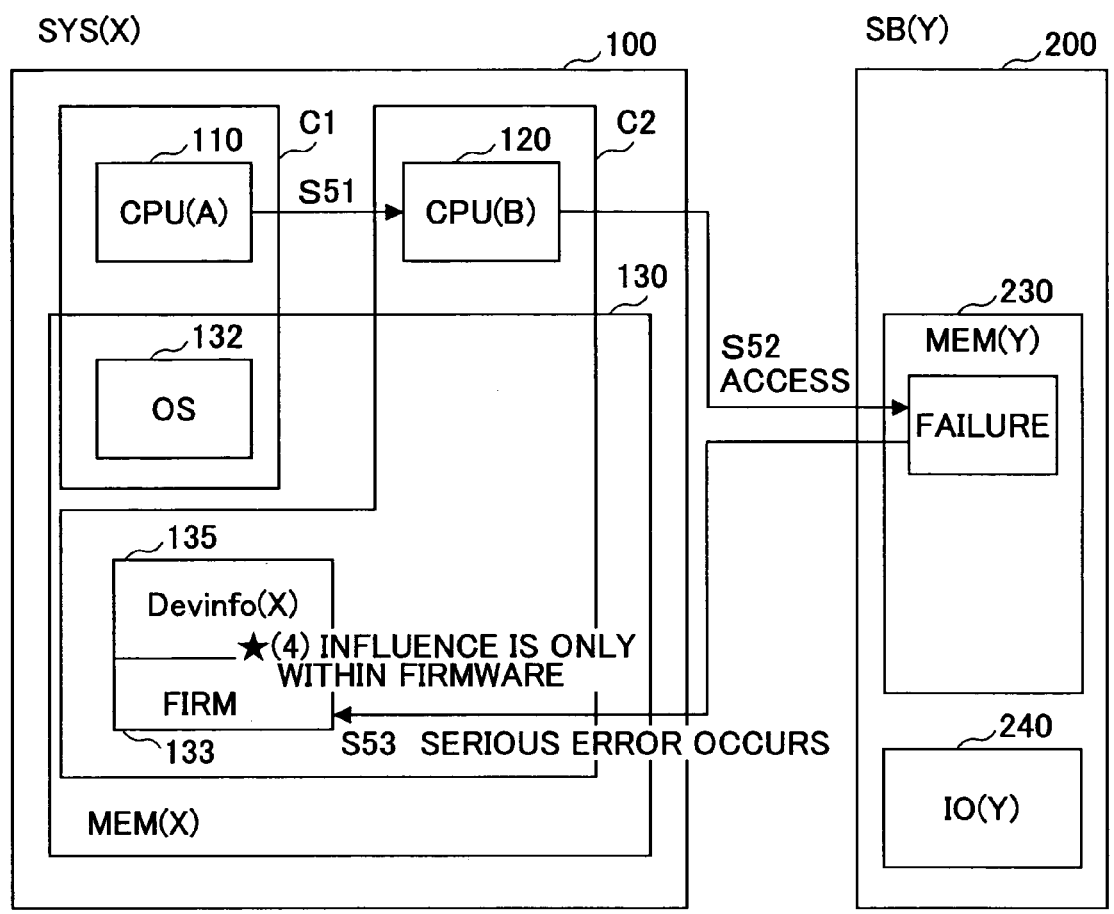
FIG. 7 shows an apparatus block diagram for generally illustrating the method for incorporating a new device in an information processing apparatus according to the embodiment of the present invention.

FIG. 6 shows a procedure of a hardware adding processing according to one embodiment of the present invention. FIG. 7 shows a configuration of a system to which the embodiment of the present invention is applied.

In FIG. 7, SYS(X) 100 denotes a system under the control of an OS. In the system SYS(X) 100, a plurality of CPUs are mounted. In an example of FIG. 7, two CPUs, i.e., a CPU(A) 110 and a CPU(B) 120, are mounted. Further, a memory MEM(X) 130 is mounted in the system SYS(X) 100.

The memory MEM(X) 130 stores, as shown, the OS 132, a firmware 133 and device configuration information Devinfo (X) 135.

SB(Y) 200 denotes a system board, and is a hardware resource to be newly added to the system SYS(X) 100. In the system board SB(Y) 200, a memory MEM(Y) 230 and an IO(Y) 240 are mounted. However, no CPU is mounted in the system board SB(Y) 200.

C1 and C2 denote respective control systems. The control systems C1 and C2 mean respective scopes placed under the control of the OS 132 or under the control of the firmware 133. In an example of FIG. 7, the control system C1 denotes a scope placed under the control of the OS 132, and the CPU(A) 110 belongs to the control system C1. On the other hand, the control system C2 denotes a scope placed under the control of the firmware 133, and the CPU(B) 120 belongs to the control system C2. The control systems C1 and C2 are basically independent from one another. Further, which one of the control systems each CPU belongs to is dynamically changed, and allocation of the CPUs are not limited to that shown in FIG. 7.

In the embodiment of the present invention, as shown in FIGS. 6 and 7, when the system board SB(Y) 200 having no CPU mounted thereto is newly incorporated under the control of the OS 132 which controls operation of the CPU(A) 110 and the CPU(B) 120, control of the CPU(B) 120 from among the CPUs 110 and 120 allocated for the control system C1 of the OS 132 is removed from the control system C1, and then, is transferred to the control system C2 (Step S41 in FIG. 6). As a result, as shown in FIG. 7, the two control systems C1 and C2 separately exist in the system SYS(X) 100.

Then, the CPU(A) 110 allocated for and belonging to the control system C1 of the OS 132 carries out inter-CPU communication (Steps S42, S43) and sends instructions to the CPU(B) 120 (Step S51 of FIG. 7) allocated for and belonging to the control system C2. The CPU(B) 120 thus receiving the instructions carries out diagnosis, initialization and device configuration information creation (Step S44 of FIG. 6; Step S52 of FIG. 7) of the devices (i.e., the memory MEM(Y) 230 and the IO(Y) 240) to be newly incorporated.

Thus, in this procedure, the CPU(B) 120 allocated for and belonging to the control system C2 of the firmware 133 carries out diagnosis, initialization and device configuration information creation (Step S44 of FIG. 6; Step S52 of FIG. 7) of the devices (i.e., the memory MEM(Y) 230 and the IO(Y) 240) to be incorporated, when the system board SB(Y) 200 as a hardware having no CPU mounted thereto is incorporated under the control of the OS 132 of the existing system SYS (X) 100. Thereby, even when a serious error occurs (Step S45 of FIG. 6; Step S53 of FIG. 7) during access to the devices (i.e., the memory MEM(Y) 230 and the IO(Y) 240) to be newly incorporated, an influence thereof is blocked within the control system C2 and is prevented from spreading to the control system C1 of the OS 132.

That is, both CPUs 110 and 120 belong to the respective different control systems C1 and C2, and merely carry out inter-CPU communication therebetween. Therefore, a series error occurring in one control system, if any, is prevented from spreading to the foundation of the other control system, which causes a shutdown thereof.

As a result, operation of adding the hardware can be carried out with effectively avoiding a risk of occurrence of a breakdown of the entire system caused by a shutdown of the OS 132.

Next, the embodiment of the present invention is described in detail with reference to figures.

As a configuration to which the embodiment of the present invention is applicable, a configuration in which a system is made cooperatively of hardware and programs (a firmware and an OS) is assumed.

This configuration includes dynamically detachable hardware and programs which can respond to such a condition that hardware resources are dynamically added/removed.

Figure 8:
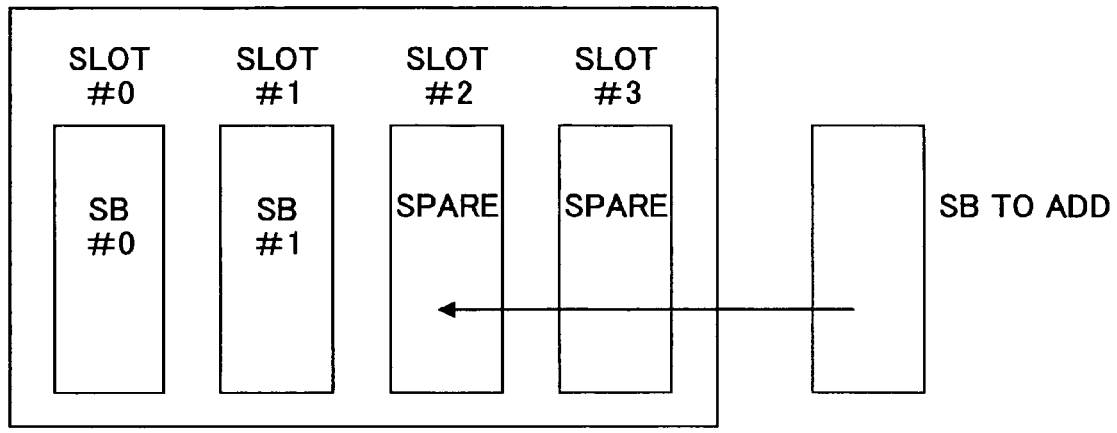
FIG. 8 shows a slot configuration for system boards in one example of the information processing apparatus for which the method for incorporating a new device in an information processing apparatus according to the embodiment of the present invention is applicable.

FIG. 8 shows slots of an information processing apparatus to which the embodiment of the present invention can be applied. FIG. 8 shows a frame of the information processing apparatus. There, a backplane not shown is provided, and connectors, also not shown, are provided for connecting various types of boards.

In this system, a single OS may be applied and thus may function for a plurality of system board resources. The term 'system board' may be simply abbreviated as 'SB', hereinafter.

Further, in this system, a plurality of domains may be made to operate simultaneously. The domain means an environment in which a single OS functions.

This system is configured in such a manner that, during operation under the control of the OS, a SB may be inserted in a spare slot of the apparatus, and, a device operating according to the OS may access to another device mounted on the SB thus inserted.

Further, according to the embodiment of the present invention, the OS may function with the use of a plurality of CPUs.

Thus, in the information processing apparatus according to the embodiment of the present invention, a plurality of domains may be created in the system applying a plurality of SBs. In this configuration, the following advantages are expected:

That is, two domains may be created in the system, i.e., a waiting system and an operation system.

Further, resources, originally belonging to one domain having a low load, may be allocated for another domain having a high load, in SB units.

Further, for a domain having a higher load, a hardware resource may be added in a SB unit.

Figure 9:
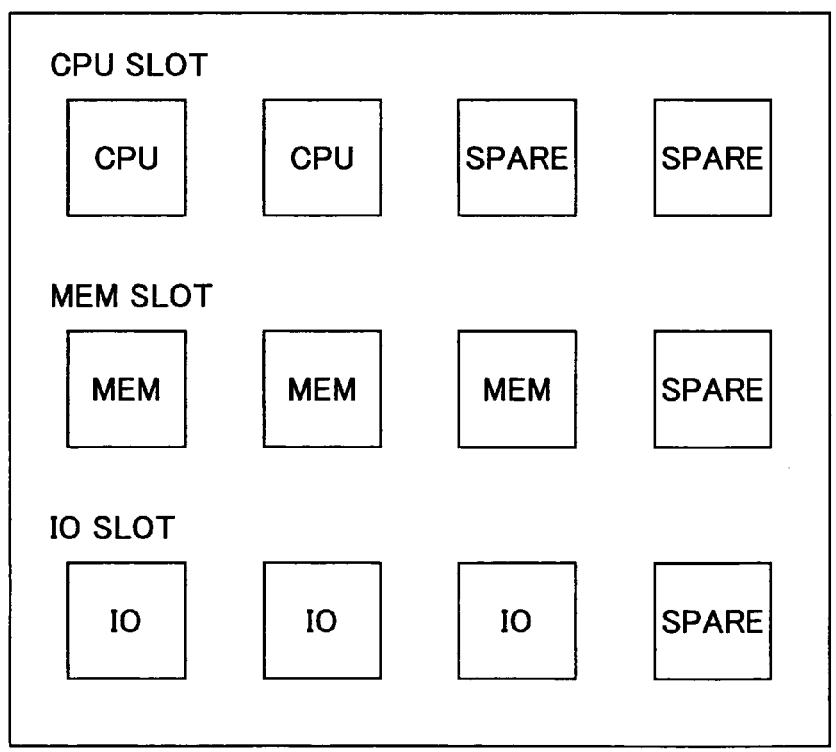
FIG. 9 shows one example of a slot configuration on a system board shown in FIG. 8.

Further, in each SB, a CPU, an IO or a memory may be mounted arbitrarily (see FIG. 9).

Further, in this configuration, the firmware and the OS are allowed to function with the use of a plurality of arbitrary SB resources.

Further, in this configuration, the firmware is expanded in the memory at a time of system starting up, the firmware creates device configuration information in the memory and starts up the OS.

The OS controls the respective devices belonging to the system with the use of the device configuration information thus-created by the firmware.

Next, with reference to figures, as a method for carrying out the above-mentioned hardware adding processing, a method for newly incorporating a device to the above-mentioned system (i.e., the information processing apparatus) according to the embodiment of the present invention is described in detail.

Here, an example in which, as shown in FIG. 8, a new system board SB#2 having no CPU mounted thereto is added to a system in which two system boards SB#0 and SB#1 are already loaded in respective slots, is assumed.

Figure 10:
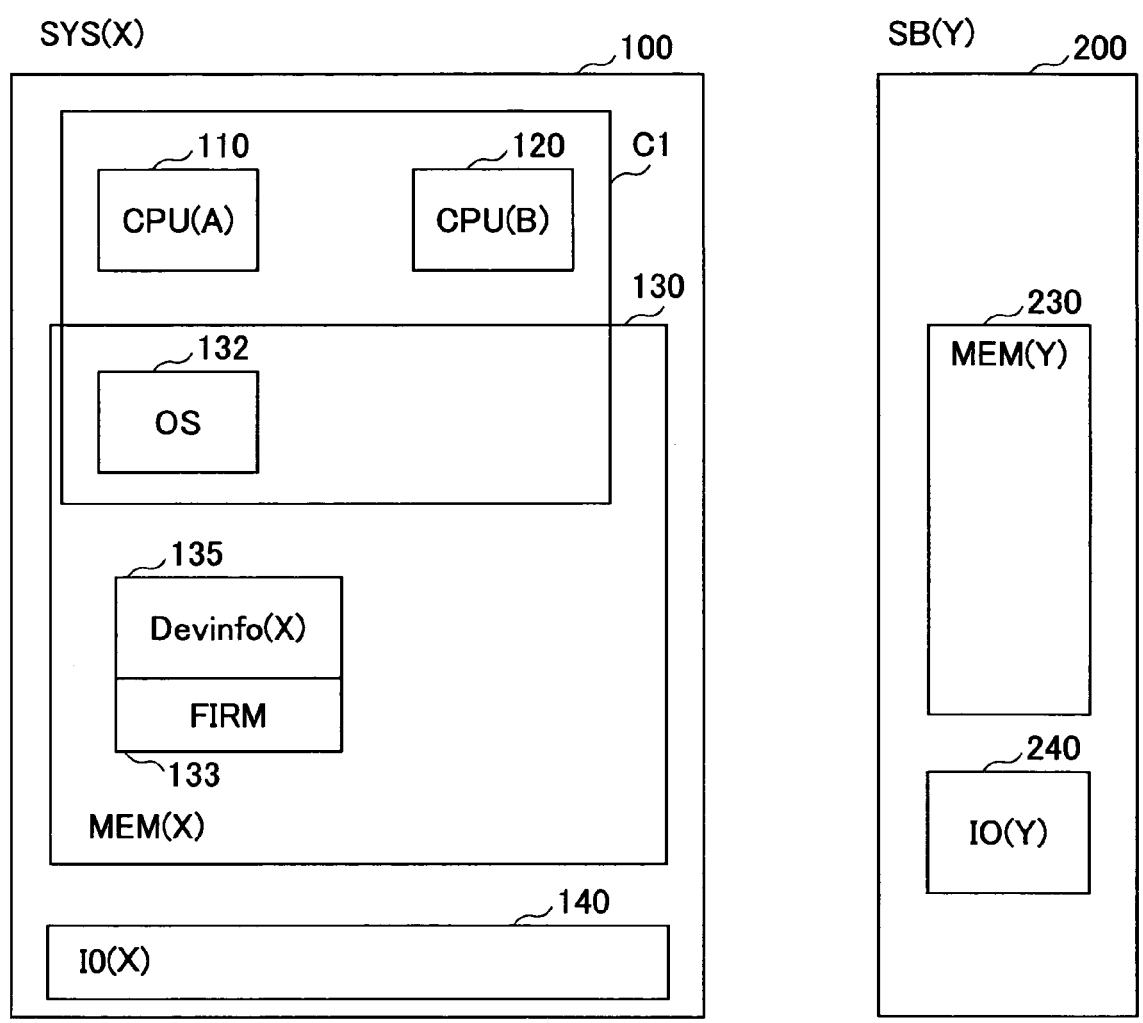
FIGS. 10 shows an apparatus block diagram for illustrating details of the method for incorporating a new device in an information processing apparatus according to the embodiment of the present invention.

FIG. 10 shows a specific configuration of a system to which the embodiment of the present invention is applied.

In FIG. 10, SYS(X) 100 denotes a system under the control of an OS, which system has two CPUs, i.e., a CPU(A) 110 and a CPU(B) 120 mounted thereto. In the system SYS(X) 100, a memory MEM(X) 130 is mounted.

In the memory MEM(X) 130, a firmware 133 and device configuration information Devinfo(X) are stored.

SB(Y) 200 denotes a system board, which is a hardware resource to be added to the system SYS(X) 100. A memory MEM(Y) 230 and an IO(Y) 240 are mounted to the SB(Y) 200, but no CPU is mounted there.

In the system SYS(X) 100, the CPU(A) 110 and the CPU(B) 120 currently belong to a control system C1.

That is, as shown in FIG. 10, in the system SYS(X) 100, the CPU(A) 110 and the CPU(B) 120 are placed and operate under the control of the OS 132. The system SYS(X) 100 shown has system boards SB#0 and SB#1 as shown in FIG. 8 currently used.

The CPU(A) 110 and the CPU(B) 120 as well as the memory MEM(X) 130 operate in the system SYS(X) 100.

FIRM 133 denotes the firmware belonging to the system SYS(X) 100. Devinfo(X) 135 denotes the device configuration information, created by the firmware FIRM 133, concerning the devices (the memory MEM(X) 130 and the IO(X) 140) already included in the system SYS(X) 100.

The firmware FIRM 133 is expanded in the memory MEM(X) 130 when the system SYS(X) 100 is started up, the firmware FIRM 133 creates in the memory MEM(X) 130 the device configuration information Devinfo(X) 135, and starts up the OS 132. Then, the OS 132 controls the devices (the memory MEM(X) 130 and the IO(X) 140) already included in the system SYS(X) 100 with the use of the device configuration information Devionfo(X) 135 created by the firmware FIRM 133.

The SB(Y) 200 corresponds to SB#2 shown in FIG. 8, is hardware to be added to the system SYS(X) 100, and has no CPU mounted thereto. Accordingly, the SB(Y) 200 cannot carry out, by itself, diagnosis, initialization and device configuration information creation of the devices (the memory MEM(Y) 230 and the IO(Y) 240) mounted to itself. Therefore, in order to incorporate the SB(Y) 200 under the control of the OS 132 of the existing system SYS(X) 100, necessary operation, i.e., diagnosis, initialization and device configuration information creation of the devices mounted to the SB(Y) 200, should be carried out by the CPU(A) 110 or the CPU(B) 120 of the existing system SYS(X) 100.

MEM(Y) 230 and IO(Y) 240 denote the memory and the IO as the devices mounted to the SB(Y) 200.

First, it is assumed that, when the SB(Y) 200 is added to the existing system SYS(X) 100, the above-mentioned devices, i.e., the memory MEM(X) 130, the IO(X) 140, the memory MEM(Y) 230 and the IO(Y) 240, are under the following condition:

The OS 132 and the firmware FIRM 133 function from the memory MEM(X) 130 of the existing system SYS(X) 100.

The device configuration information Devinfo(X) 135 concerning the existing devices mounted already to the system SYS(X) 100 is created by the firmware FIRM 133, and is stored in the memory MEM(X) 130.

As mentioned above, the CPU(A) 110 and the CPU(B) 120 included in the system SYS(X) 100 currently belong to the control system C1 under the control of the OS 132.

The memory MEM(Y) 230 and the IO(Y) 240 are mounted to the SB(Y) 200, for which device configuration information has not been created. As a result, these devices 230 and 240 are not yet under the control of the OS 132 even after they are physically connected to the system SYS(X) 100 as the devices mounted to the SB(Y) 200.

A specific procedure carried out for adding the new hardware SB#2, i.e., the SB(Y) 200, having no CPU mounted thereto, to the system SYS(X) 100 shown in FIG. 10, is described next.

Figure 11:
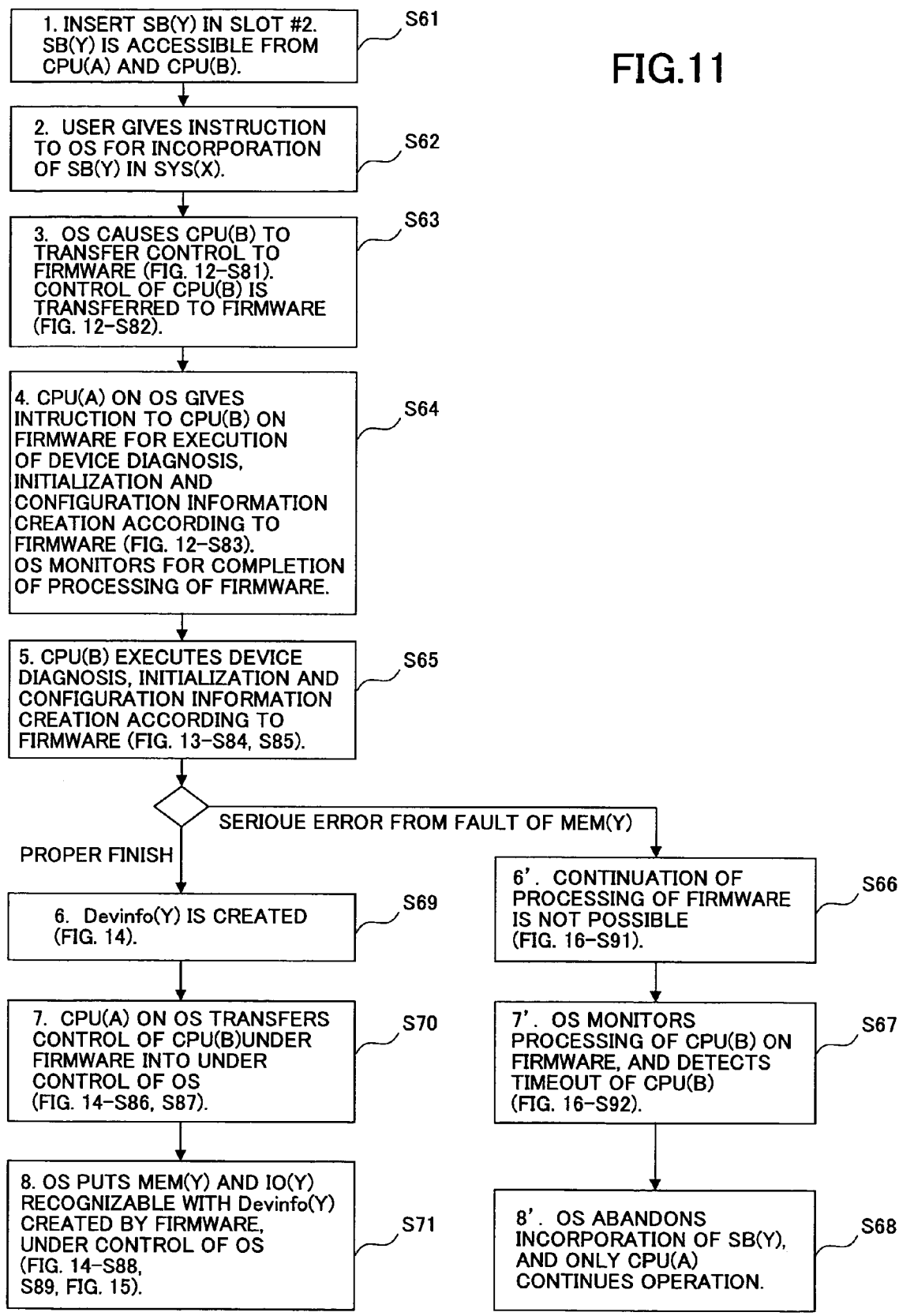
FIG. 11 shows an operation flow chart illustrating details of the method for incorporating a new device in an information processing apparatus according to the embodiment of the present invention.

FIG. 11 shows a flow chart of this procedure.

First, in Step S61, a user inserts the SB(Y) 200 in the spare slot #2 of the information processing apparatus 100 configuring the system SYS(X) 100.

As a result, the SB(Y) 200 enters a state such that the SB(Y) 200, i.e., the memory MEM(Y) 230 and the IO(Y) 240 mounted thereto, is accessible by the CPU(A) 110 and the CPU(B) 120.

In Step S62, the user of the system SYS(X) 100 carries out operation to input instructions to the OS 132 for incorporating the SB(Y) 200 in the SYS(X) 100.

Figure 12:
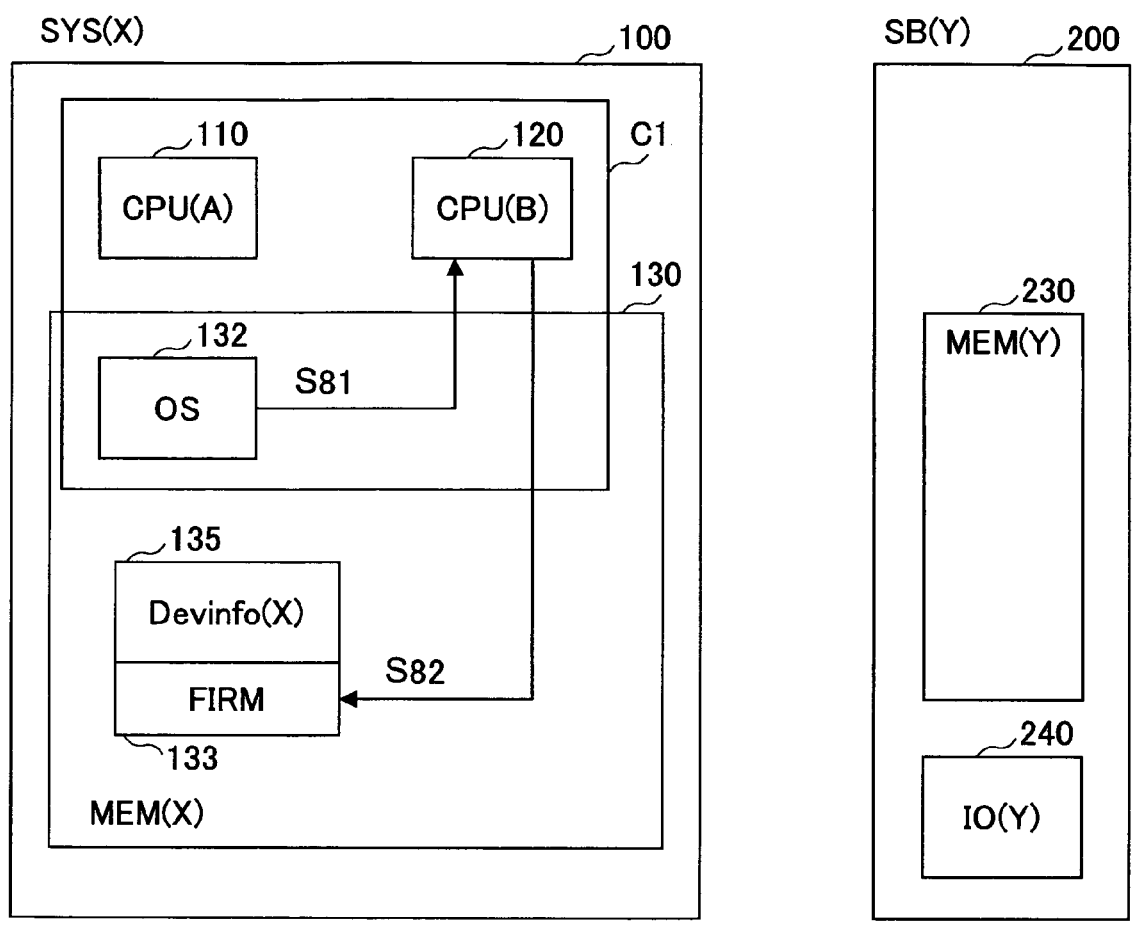
FIGS. 12, 13, 14, 15 and 16 show other apparatus block diagrams illustrating the details of the method for incorporating a new device in an information processing apparatus according to the embodiment of the present invention.

In response thereto, in Step S63, the OS 132 causes the CPU(B) 120 to transfer itself under the control of the firmware FIRM 133, i.e., to cause the CPU(B) 120 to belong to the control system C2 (Step S81 of FIG. 12).

As a result, the CPU(B) 120 is actually transferred under the control of the firmware FIRM 133 (Step S82 of FIG. 12).

Figure 13:
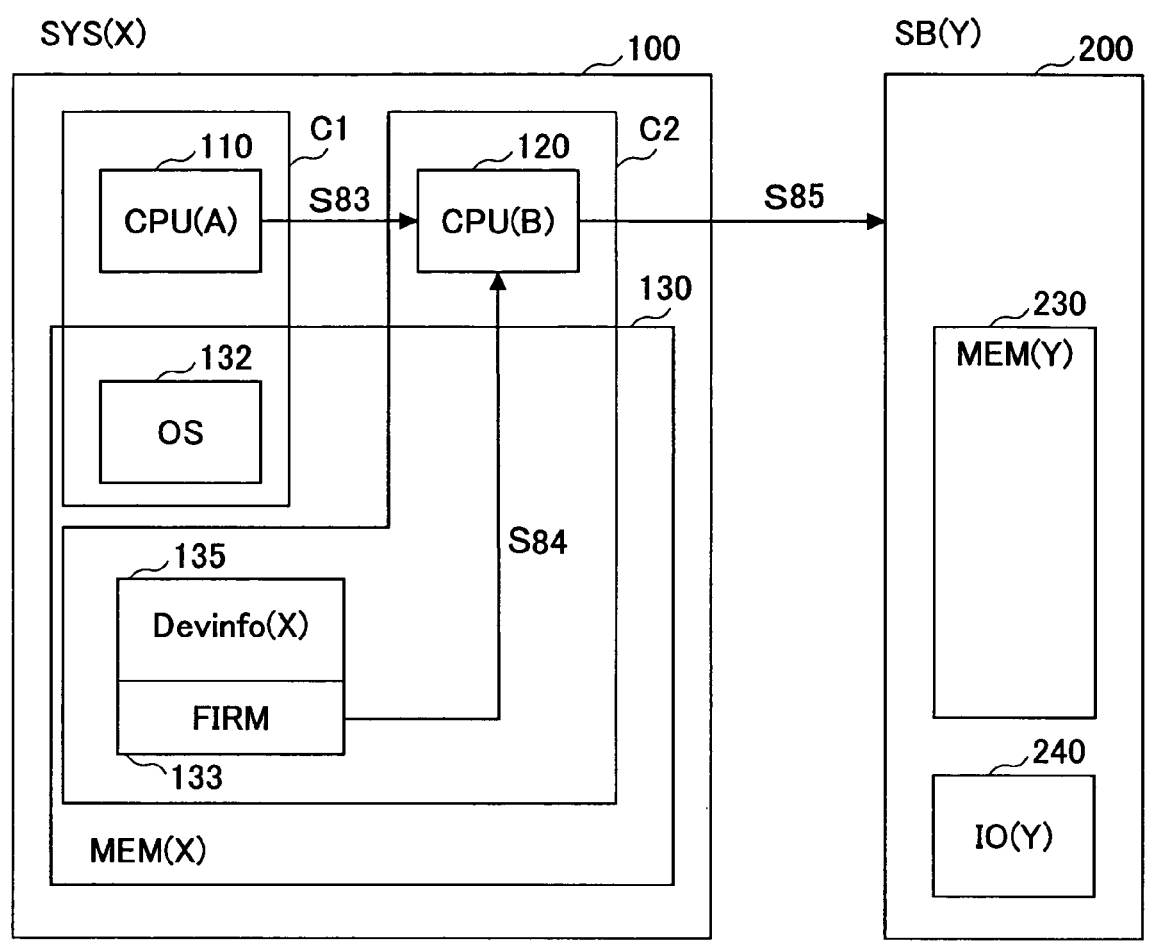

Then, in Step S64, the CPU(A) 110 still left under the control of the OS 132 provides instructions to the CPU(B) 120 via inter-CPU communication such that the CPU(B) 120 now transferred under the control of the firmware FIRM 133 may carry out diagnosis, initialization and device configuration information creation of the devices 230 and 240 of the SB(Y) 200 according to the firmware FIRM 133 (Step S83 of FIG. 13).

After that, the CPU(A) 110 belonging to the control system C1 of the OS 132 monitors operation of the CPU(B) belonging to the control system C2 under the control of the firmware FIRM 133, for the completion of the above-mentioned processing, i.e., diagnosis, initialization and device configuration information creation of the devices 230 and 240 of the SB(Y) 200 according to the firmware FIRM 133.

In Step S65, the CPU(B) 120 directly accesses the devices 230 and 240 mounted to the SB(Y) 200, and carries out diagnosis, initialization and device configuration information creation of the devices 230 and 240 of the SB(Y) 200 according to the firmware FIRM 133 (Steps S84 and S85 of FIG. 13).

Figure 14:
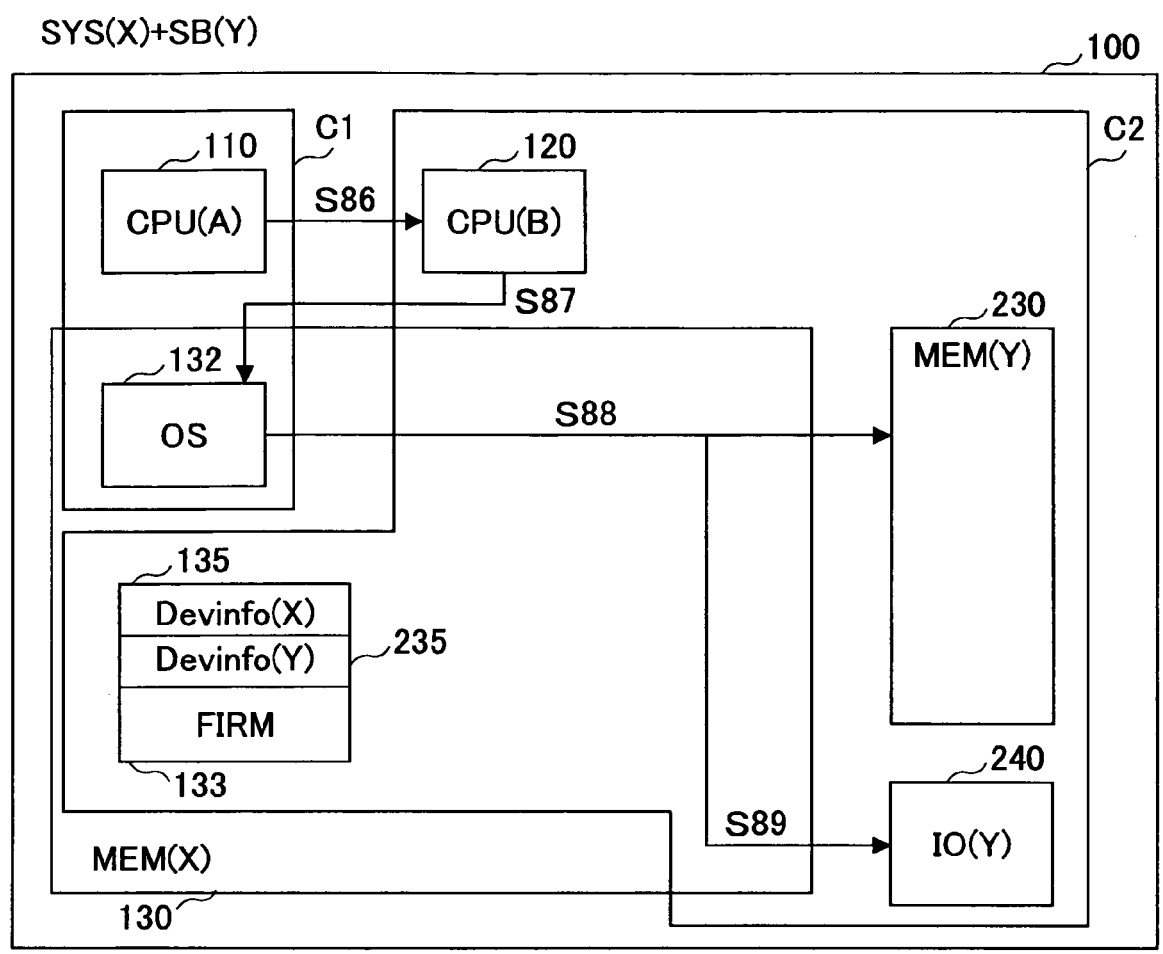

After the processing of Step S65 is properly finished, the device configuration information Devinfo(Y) 235 is obtained (Step S69 of FIG. 14). The thus-obtained device configuration information Devinfo(Y) 235 is stored in the memory MEM(X) 130.

In Step S70, the CPU(A) 110 under the control of the OS 132 provides instructions to the CPU(B) 120 via inter-CPU communication such that the CPU(B) 120 now under the firmware FIRM 133 may return to the control system C1 under the control of the OS 132 (Steps S86 and S87 of FIG. 14).

Figure 15:
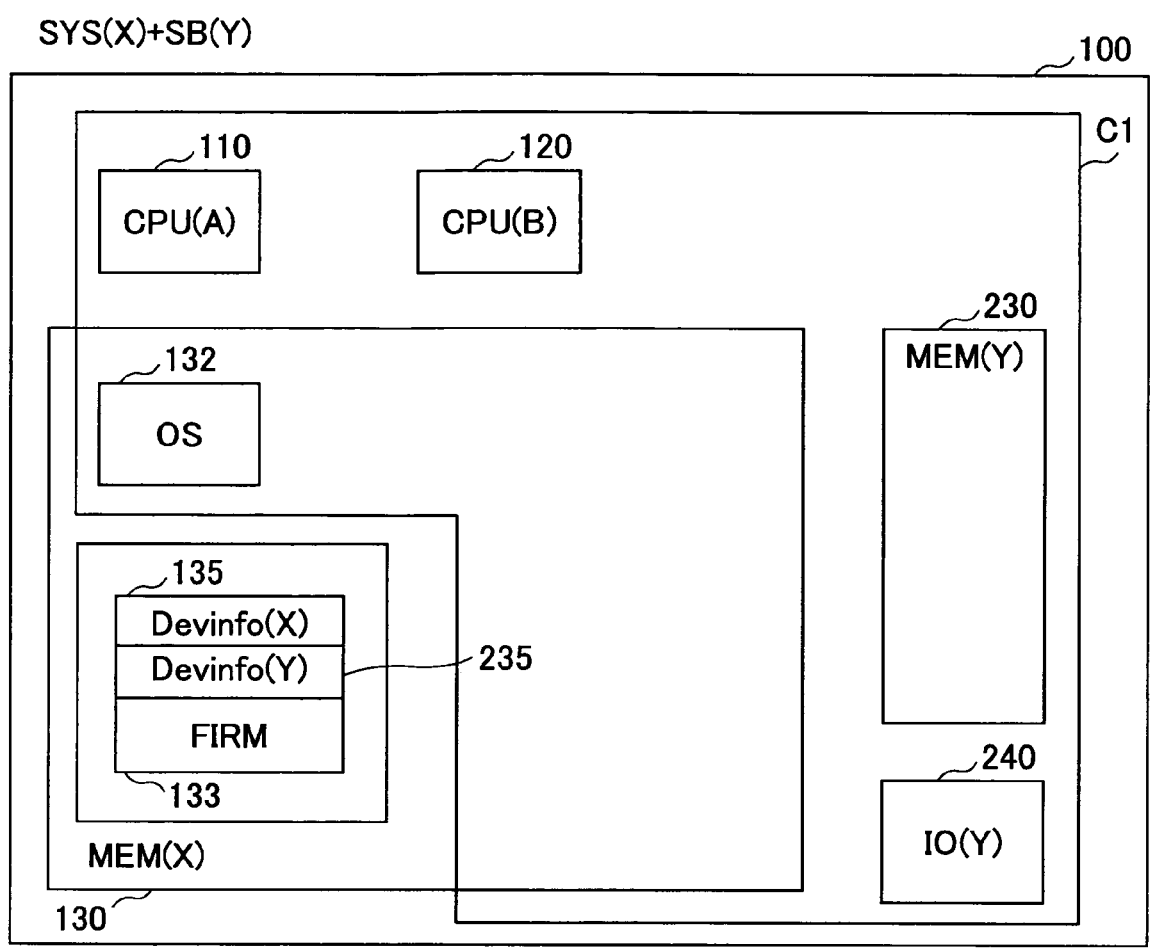

In Step S71, the devices as new hardware, i.e., the memory MEM(Y) 230 and the IO(Y) 240, mounted to the SB(Y) 200, which are now recognizable by the OS 132 by means of the thus-obtained device configuration information Devinfo(Y) 235 created by the function of the firmware FIRM 233, are thus placed under the control of the OS 132 (Steps S88 and S89 of FIG. 14 and FIG. 15).

Next, a case where a trouble occurs during access to the devices on the SB(Y) 200, i.e., the memory MEM(Y) 230 and the IO(Y) 240, is described.

For example, when a serious error occurs during the processing of Step S65 due to a failure in the memory MEM(Y)

Figure 16:
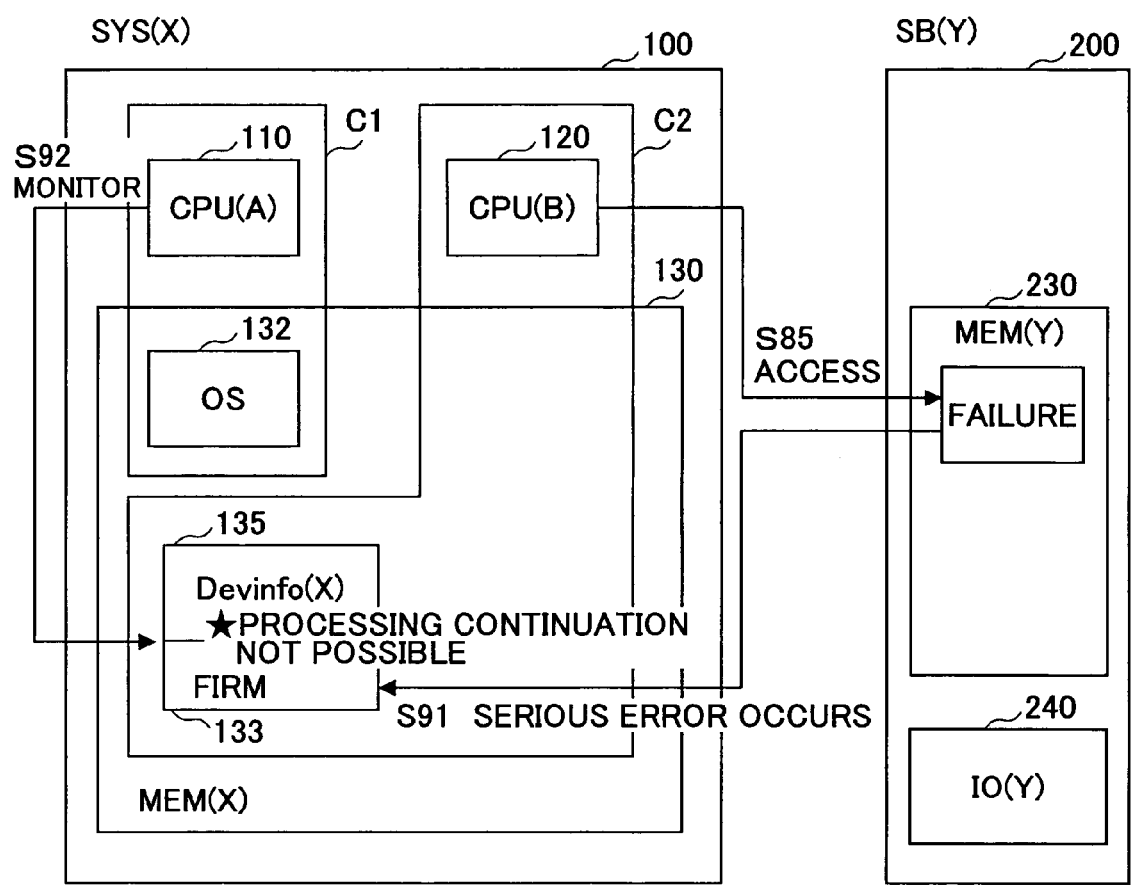

230 for example, normal processing by the function of the firmware FIRM 233 is not possible (Step S66; Step S91 of FIG. 16).

The OS 132 monitors operation of the CPU(B) 120 under the control of the firmware FIRM 133 during the processing of the CPU(B) 120. Then, when continuation of the normal processing by the CPU(B) 120 is thus blocked by the serious error in Step S91, the OS 132 detects a time-out for the CPU(B) 120 (Step S92 of FIG. 16). That is, the OS 132 detects a matter that predetermined processing has not been completed during a predetermined time period, and determines a trouble has occurred.

In Step S68, the OS 132 abandons incorporation of the SB(Y) 200, and operation of the system SYS(X) 100 only by the CPU(A) 110 is continued.

Thus, in the embodiment of the present invention, the CPU (B) 120 which directly accesses the new hardware, i.e., the SB(Y) 200 (devices 230 and 240), is once disconnected from the control system C1 of the OS 132. Then, the CPU(B) 120 thus disconnected from the control system C1 is then transferred to the control system C2 under the control of the firmware FIRM 133, separate from the control system C1 under the control of the OS 132. After the transfer between the control systems is thus made, the CPU(A) 110 under the control of the OS 132 provides necessary instructions to the CPU(B) 120 under the control of the firmware FIRM 133, and monitors operation of the CPU(B) 120 via inter-CPU communication.

Therefore, an appropriate program design may be made such that, even when a serious error occurs during access to the SB(Y) 200 by the CPU(B) 120 under the control of the firmware FIRM 133, and falls into an inoperative situation, operation of the CPU(A) 110 under the control of the OS 132 may not be directly affected. Thereby, a system down of the existing system SYS(X) 100 can be avoided.

Figure 17:
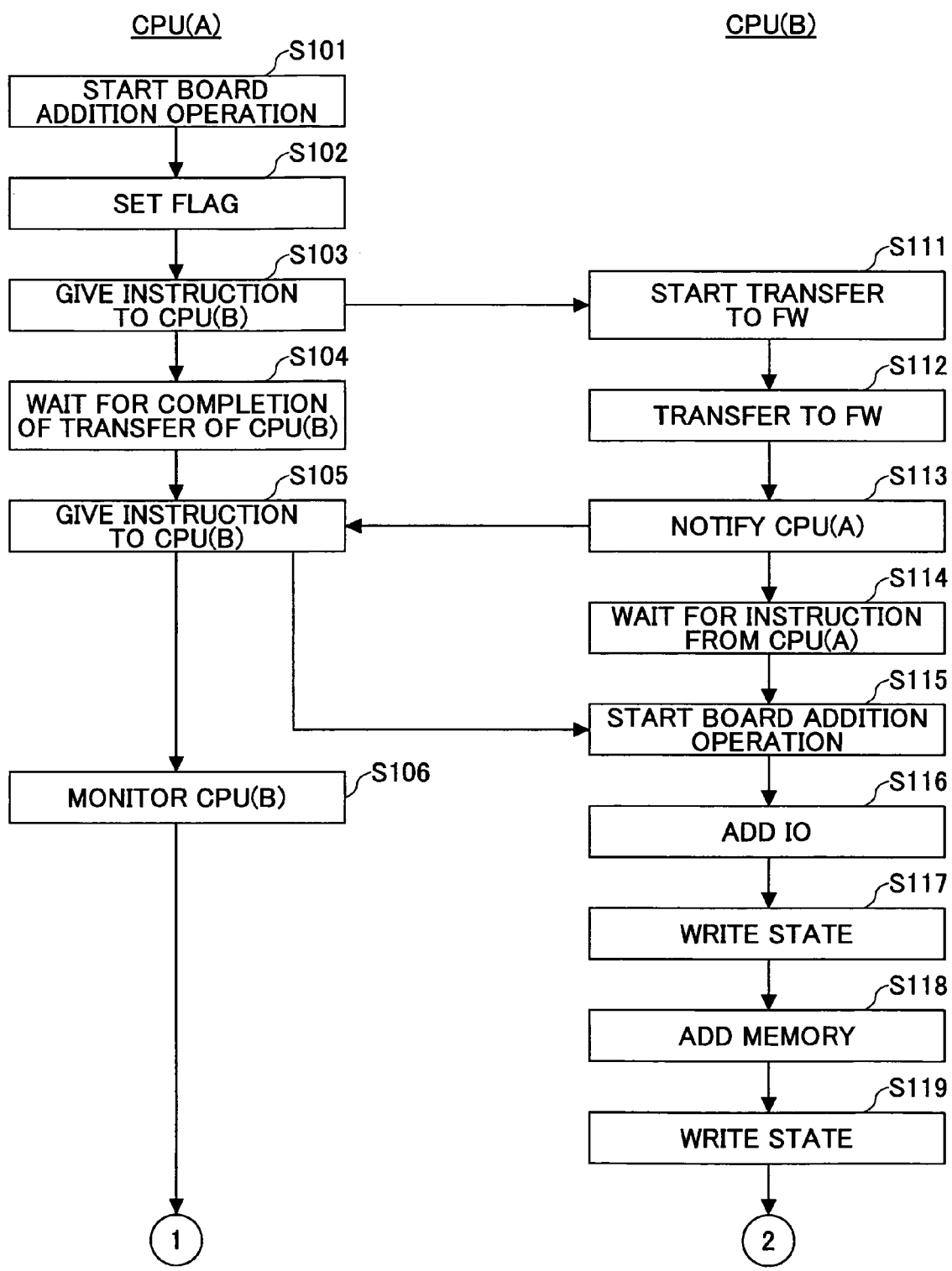
FIGS. 17 and 18 show a processing procedure for carrying out the method for incorporating a new device in an information processing apparatus according to the embodiment of the present invention.
Figure 18:
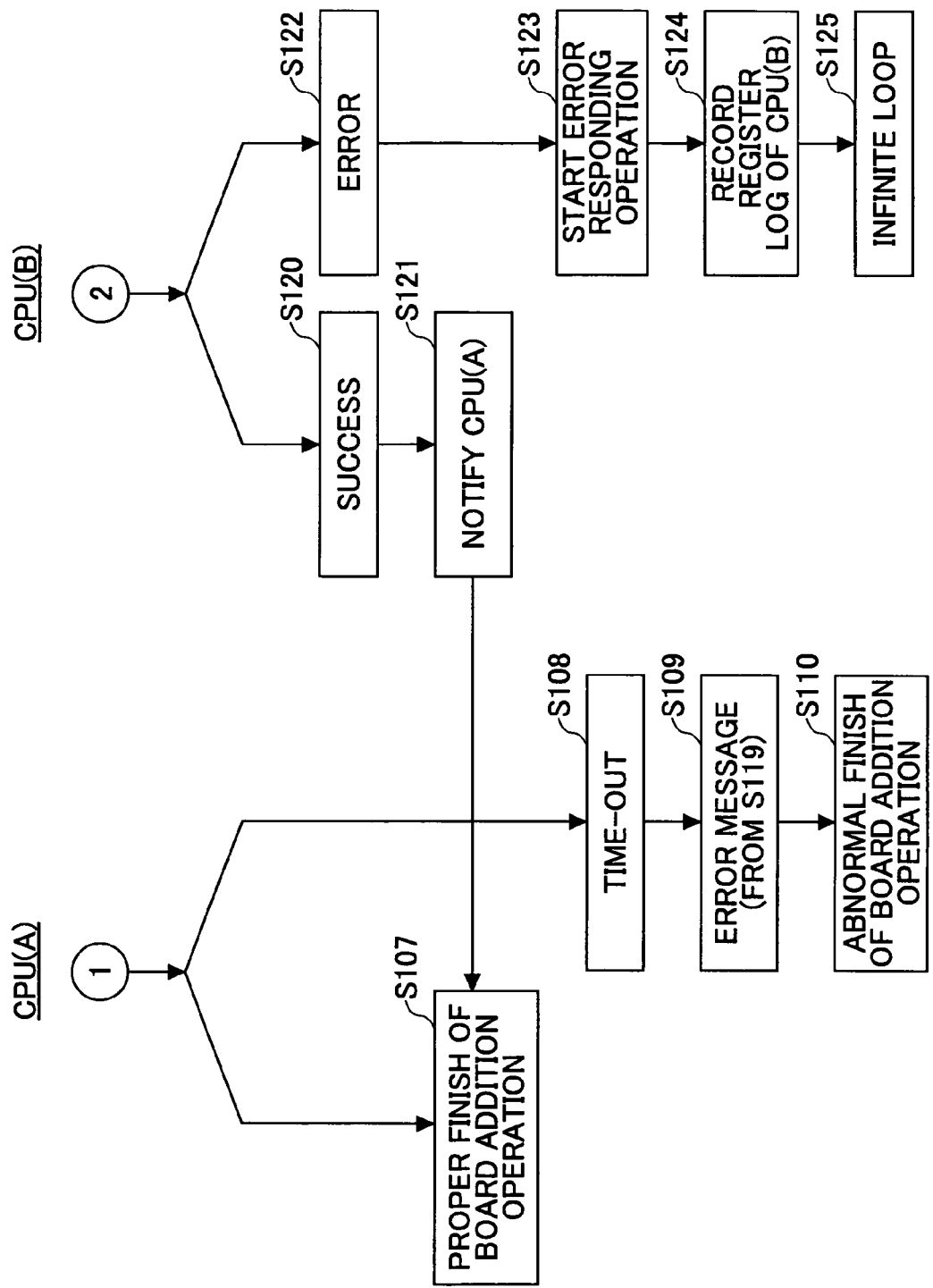

With reference to FIGS. 17 and 18, the processing procedure of incorporating a new hardware in an information processing apparatus according to the embodiment of the present invention, described above, is descried next, in view of operation of the respective CPUs according to a software program or such.

In Step S101 of FIG. 17, the CPU(A) 110 operating under the control of the OS 132 starts operation of adding the SB(Y) 200, as operation for incorporating the new hardware resource, according to instructions given by a user.

In Step S102, the CPU(A) 110 sets an information area (flag) for communicating information concerning the operation of adding the SB(Y) 200.

In Step S103, the CPU(A) 110 provides instructions to the CPU(B) 120 also currently under the control of the OS 132, via inter-CPU communication, such that the CPU(B) 120 may be transferred under the control of the firmware FIRM 133.

In response thereto, the CPU(B) 120 starts operation of transferring itself under the control of the firmware FIRM 133, in Step S111.

Further, in Step S112, the CPU(B) 120 completes transferring itself under the control of the firmware FIRM 133, and notifies the CPU(A) 110 of this matter via inter-CPU communication.

During this process, the CPU(A) 110 waits in Step S104 for the above-mentioned notification to be made by the CPU(B) 120. When receiving the corresponding notification from the CPU(B) 120 in Step S133, the CPU(A) 110 provides the CPU(B) 120 of instructions, via inter-CPU communication, for the operation of actually adding the SB(Y) 200.

During this process, the CPU(B) 120 waits for instructions from the CPU(A) 110 in Step S114. Then, when the CPU(B) 120 receives the corresponding instructions from the CPU(A) 110 in Step S115, the CPU(B) 120 starts the operation of actually adding the SB(Y) 200.

Then, in Step S116, the CPU(B) 120 first carries out processing required for bringing the IO(Y) 240 of the SB(Y) 200 under the control of the OS 132, i.e., diagnosis, initialization and device configuration information creation of the device 240. The CPU (B) 120 writes in the flag, that the CPU (B) 120 is currently carrying out the processing for the IO(Y) 240, in Step S117.

After the completion of the processing for the IO(Y) 240, in Step S118, the CPU(B) 120 then carries out processing required for bringing the memory MEM(Y) 230 of the SB(Y) 200 under the control of the OS 132, i.e., diagnosis, initialization and device configuration information creation of the device 230. The CPU(B) 120 writes in the flag, that the CPU(B) 120 is currently carrying out the processing for the memory MEM(Y) 230, in Step S119.

During this process, the CPU(A) 110 monitors operation of the CPU(B) 120 in Step S106. In this case, a timer is set. Then, when a notification of Step S121 of a proper finish of the processing of Steps S116 and S118 is not received within a predetermined time period (i.e., a time-out is generated in Step S108), operation of Steps S109 through S110 is carried out by the CPU(A) 110.

When the CPU(B) 120 properly finishes the above-mentioned processing concerning the IO(Y) 240 and the memory MEM(Y) 230, i.e., diagnosis, initialization and device configuration creation are properly finished (Step S120 of FIG. 18), the CPU(B) 120 notifies the CPU(A) 110 of this matter in Step S121.

In response thereto, the CPU(A) 110 terminates the operation of adding the SB(Y) 200 normally in Step S107 of FIG. 18.

On the other hand, when an error occurs due to some cause during the processing concerning the IO(Y) 240 or the memory MEM(Y) 230, i.e., diagnosis, initialization and device configuration creation of the same (Step S122), the CPU(B) 120 carries out predetermined error responding operation under the control of the firmware FIRM 133 in Step S123.

That is, in Step S124, the CPU(B) 120 records its own register log for the purpose of error cause investigation in future, and, in Step S125, CPU(B) 120 executes an infinite loop in such a manner of not influencing operation of the OS 132.

In Step S109, the CPU(A) 110 refers to the information written in the flag by the CPU(B) 120 in Step S117/S119 of FIG. 17, i.e., refers to the operation carried out by the CPU(B) 120 before the above-mentioned error occurred. Then, the CPU(A) 110 generates an error message corresponding to the information thus referred to. Then, in Step S110, the CPU(A) 110 terminates the operation of adding the SB(Y) 200, abnormally in this case.

The user refers to the thus-generated error message, and thus, may make an appropriate action, i.e., exchanging/repairing the corresponding part of the SB(Y) 200, for example.

Figure 19:
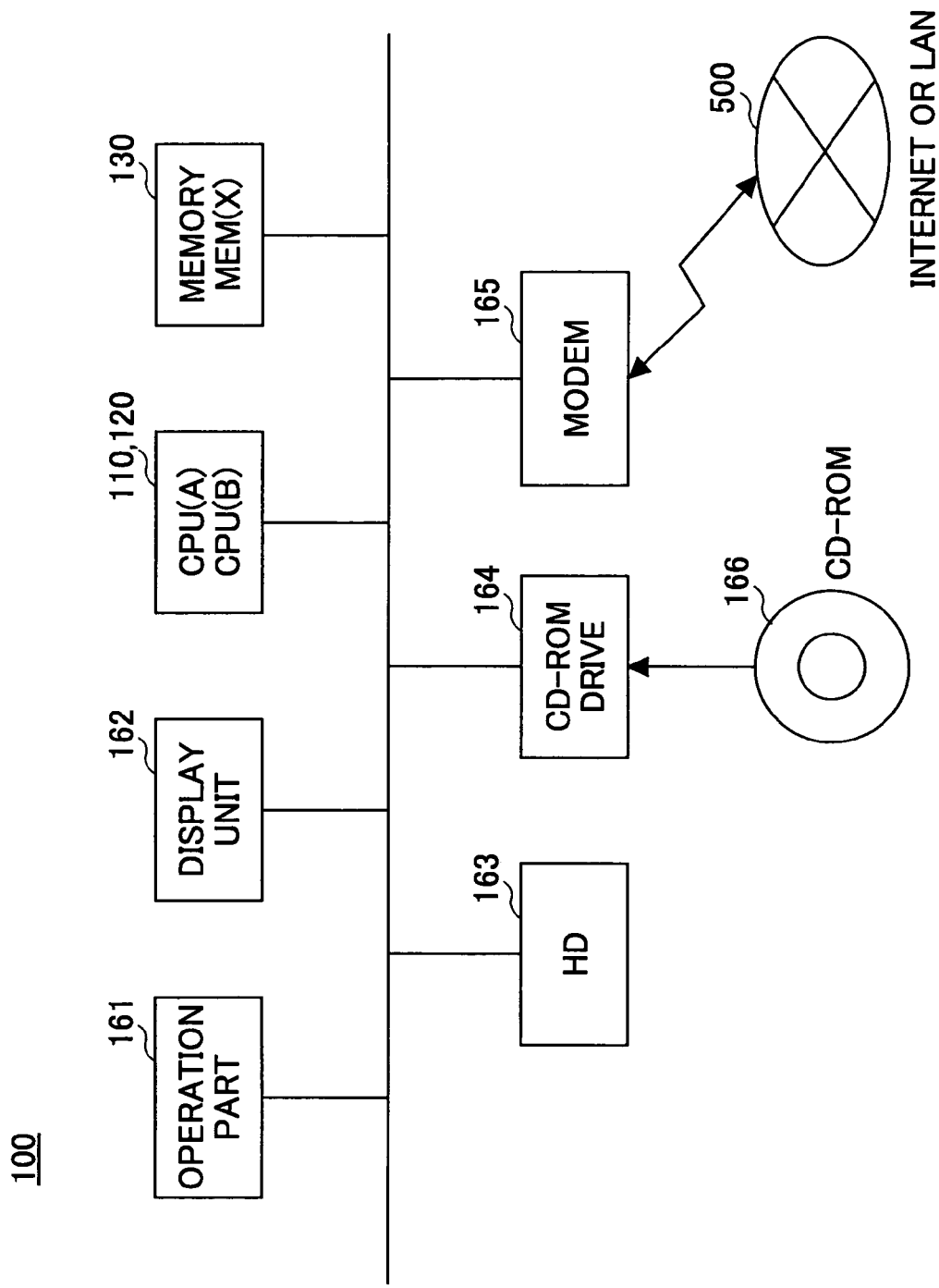
FIG. 19 shows a block diagram of the information processing apparatus to which the method for incorporating a new device in an information processing apparatus according to the embodiment of the present invention is applicable.

FIG. 19 shows an example of hardware configuration of the information processing apparatus configuring the above-mentioned system SYS(X) 100 according to the embodiment of the present invention.

As shown, the information processing apparatus 100 configuring the system SYS(X) 100 for example includes the CPU(A) 110 and the CPU(B) 120, the memory MEM(X) 130, an operation part 161 for inputting various sorts of instructions through operation by a user, a display unit 162 displaying various sorts of information to the user, a hard disk drive 163 for storing programs, data and so forth, a CD-ROM drive 164 for externally loading a program or such via a CD-ROM 166 as a carriable information recording medium, and a modem 165 for externally communicating via a communication network 500 such as the Internet, a LAN, or such.

In this system shown in FIG. 19, a program for executing the above-described method for newly incorporating a hardware resource in the information processing apparatus 100 according to the embodiment of the present invention is stored in the CD-ROM 166. With the use of the CD-ROM drive 164, the program is read out from the CD-ROM 166, and instructions of the program are executed by the CPU(A) 110/CPU(B) 120 of the information processing apparatus 100. Thereby, the method for newly incorporating a hardware resource in the information processing apparatus 100 according to the embodiment of the present invention is executed by the information processing apparatus 100.

Instead of thus applying the carriable information recording medium such as the CD-ROM 166, the same program may be downloaded in the information processing apparatus 100 of FIG. 19 from an external server (not shown) via the communication network 500. Also in this way, the method for newly incorporating a hardware resource in the information processing apparatus 100 according to the embodiment of the present invention can be executed by the information processing apparatus 100 in the same manner.

Further, the present invention is not limited to the above-described embodiment, and variations and modifications may be made without departing from the basic concept of the present invention claimed below.

The present application is based on Japanese Priority Application No. 2005-301768, filed on Oct. 17, 2005, the entire contents of which are hereby incorporated herein by reference.

What is claimed is:

1. A method of incorporating a new device in an information processing apparatus, comprising:
   dividing a control system of the information processing apparatus into a plurality of control systems that are independent from each other, each of which plurality of control systems is controlled by a different computer program;
   causing a first CPU which is designated for a first control system of the plurality of control systems to carry out processing for controlling the new device by directly accessing the new device; and
   causing a second CPU which is designated for a second control system of the plurality of control systems, and is different from the first CPU, to control the first CPU which directly accesses the new device to carry out processing for controlling the new device.

2. The method as claimed in claim 1, wherein:
   the second CPU is controlled by an OS as a computer program of the computer programs, and the first CPU is not controlled by the OS.

3. The method as claimed in claim 1, wherein:
   the processing for controlling the new device comprises diagnosis, initialization and creation of configuration information of the new device.

4. The method as claimed in claim 1, wherein:
   the processing for controlling the new device is executed under the control of firmware as a first computer program of the computer programs under a condition of being monitored under the control of an OS as a second computer program of the computer programs.

5. The method as claimed in claim 4, wherein:
   the second CPU designated for the second control system provides an instruction to the first CPU designated for the first control system to cause the first CPU to carry out the processing for controlling the new device under the control of the OS as the second computer program; and
   the first CPU directly accesses the new device to carry out the processing for controlling the new device according to the instruction of the second CPU under the control of the firmware as the first computer program.

6. The method as claimed in claim 1, wherein:
   the new device has no CPU.

7. An information processing apparatus comprising:
   a first processing part;
   a second processing part;
   a first control part configured to control at least one of the first processing part and the second processing part;
   a second control part configured to control at least one of the first processing part and the second processing part; and
   a switching part configured to switch control of the first processing part to be under the control of the first control part and to switch control of the second processing part to be under the control of the second control part, for adding hardware to the information processing apparatus, wherein:
   the first processing part and the second processing part are separate CPUs, respectively;
   the first processing part, control of which is switched by the switching part to be under the control of the first control part, accesses the hardware and carries out processing for controlling the hardware; and
   the second processing part, control of which is switched by the switching part to be under the control of the second control part, controls the first processing part which directly accesses the hardware and carries out the processing for controlling the hardware.

8. The information processing apparatus as claimed in claim 7, wherein:
   the second control part is an OS, and the first control part is firmware.

9. The information processing apparatus as claimed in claim 7, wherein:
   the processing for controlling the hardware comprises diagnosis, initialization and creation of configuration information of the hardware.

10. The information processing apparatus as claimed in claim 7, wherein:
    the processing for controlling the hardware is executed under the control of firmware under a condition of being monitored under the control of an OS.

11. The information processing apparatus as claimed in claim 10, wherein:
    the second processing part provides an instruction to the first processing part to cause the first processing part to carry out the processing for controlling the hardware under the control of the OS; and
    the first processing part directly accesses the hardware and carries out the processing for controlling the hardware according to the instruction of the second processing part under the control of the firmware.

12. The information processing apparatus as claimed in claim 7, wherein:
    the hardware has no CPU.

13. A computer readable information recording medium storing a program which, when executed by a computer processor, carries out:

incorporating a new device in an information processing apparatus;

dividing a control system of the information processing apparatus into a plurality of control systems that are independent from each other, each of which plurality of control systems is controlled by a different computer program;

causing a first CPU which is designated for a first control system of the plurality of control systems to carry out processing for controlling the new device by directly accessing the new device; and causing a second CPU which is designated for a second control system of the plurality of control systems, and is different from the first CPU, to control the first CPU which directly accesses the new device and carries out processing for controlling the new device.

14. The computer readable information recording medium as claimed in claim 13, wherein:

the program comprises instructions for causing the computer processor to cause the second CPU to be under the control of an OS as a computer program of the computer programs, and cause the first CPU not to be under the control of the OS.

15. The computer readable information recording medium as claimed in claim 13, wherein:

the processing for controlling the new device is executed under the control of firmware as a first computer program of the computer programs under a condition of being monitored under the control of an OS as a second computer program of the computer programs.

16. The computer readable information recording medium as claimed in claim 15, wherein the program further comprises instructions to cause the computer processor to carry out:

causing the second CPU which is designated for the second control system to be under the control of the OS as the second computer program, and causing the second CPU to provide an instruction to the first CPU which is designated for the first control system to cause the first CPU to carry out the processing for controlling the new device; and causing the first CPU to directly access the new device and carry out the processing for controlling the new device according to the instruction of the second CPU under the control of the firmware as the first computer program.

* * * * *